(12) United States Patent
Komazawa et al.

(10) Patent No.: US 8,084,883 B2
(45) Date of Patent: Dec. 27, 2011

(54) ELECTRIC POWER SUPPLY SYSTEM BETWEEN VEHICLE AND HOUSE

(75) Inventors: Eisuke Komazawa, Wako (JP); Takeshi Fujino, Wako (JP); Minoru Noguchi, Wako (JP); Takamichi Shimada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 12/638,202

(22) Filed: Dec. 15, 2009

(65) Prior Publication Data

US 2010/0164287 A1    Jul. 1, 2010

(30) Foreign Application Priority Data

Dec. 25, 2008  (JP) ................................. 2008-329281

(51) Int. Cl.
*B60L 1/00* (2006.01)
(52) U.S. Cl. ...................................................... 307/9.1
(58) Field of Classification Search .................. 307/9.1, 307/10.1; 320/109; 191/2; 701/33; 705/1; 903/903, 907, 908
See application file for complete search history.

(56) References Cited

U.S. PATENT DOCUMENTS

| | | | | |
|---|---|---|---|---|
| 5,462,439 A | * | 10/1995 | Keith | 320/109 |
| 5,858,568 A | * | 1/1999 | Hsu et al. | 429/425 |
| 7,747,739 B2 | * | 6/2010 | Bridges et al. | 709/224 |
| 2008/0084286 A1 | * | 4/2008 | Teramura et al. | 340/438 |
| 2008/0169651 A1 | * | 7/2008 | Oyobe et al. | 290/7 |
| 2010/0019728 A1 | * | 1/2010 | Ichikawa et al. | 320/134 |

FOREIGN PATENT DOCUMENTS

| | | |
|---|---|---|
| JP | 2001-008380 A | 1/2001 |
| JP | 2001-231106 A | 8/2001 |
| JP | 2006-020445 | 1/2006 |
| JP | 2008-061432 | 3/2008 |

OTHER PUBLICATIONS

Japanese Office Action application No. JP2008-329281 dated Mar. 22, 2011.

* cited by examiner

*Primary Examiner* — Jared Fureman
*Assistant Examiner* — Daniel Cavallari
(74) *Attorney, Agent, or Firm* — Squire, Sanders & Dempsey (US) LLP (57) ABSTRACT

An electric bower supply system includes a power supply controlling element (62) configured to switch a plug-out power supply which supplies electric power (75) from a fuel cell (20) or a battery (21) to a house (70) and a plug-in power supply which supplies electric power from a commercial power source (75) disposed in the house (70) to a fuel cell vehicle (1a) on the basis of a vehicular power state of the fuel cell (20) and the battery (21) detected by a vehicular power state detecting element (61) and a household power state of the commercial power source (75) detected by a household power state detecting element (81) when a receptacle (10) of the fuel cell vehicle (1a) and an outlet (71) of the commercial power source (75) have been connected by a power cable (100).

14 Claims, 7 Drawing Sheets

ELECTRIC POWER SUPPLY SYSTEM BETWEEN VEHICLE AND HOUSE

BACKGROUND OF THE INVENTION

1. Field of the Invention

The present invention relates to an electric power supply system which supplies electric power between a vehicle provided with a vehicular power source and a house provided with a household power source.

2. Description of the Related Art

Hitherto, there has been disclosed a system performing a so-called plug-in power supply which supplies electric power from a commercial power source disposed in a house to a vehicle via a power cable connected between an external power source connector disposed in the vehicle and an outlet of the commercial power source (for example, refer to Japanese Patent Laid-open No. 2008-61432).

According to the plug-in power supply, a battery provided in a hybrid electric vehicle or an electric automobile which uses a motor as a driving source can be charged with the electric power of the commercial power source supplied from the house.

Moreover, according to Japanese Patent Laid-open No. 2008-61432, in order to prevent the electric power from being stolen from the outlet disposed in the house, the system is configured to perform an authorization between the vehicle and a bower supply portion in the house and the plug-in power supply from the house to the vehicle is permitted only when the authorization is valid.

There has also been disclosed a system performing a so-called plug-out power supply which generates an alternating-current power same as the commercial power source and outputs it to an outlet disposed in the vehicle with the same shape as the outlet of the commercial power source (for example, refer to Japanese Patent Laid-open No. 2006-20445). As above-mentioned, one system which performs the plug-in power supply and another system which performs the plug-out power supply have been disclosed, however, a combination of the two systems has not been proposed yet.

SUMMARY OF THE INVENTION

The present invention has been accomplished in view of the aforementioned problems, and it is therefore an object of the present invention to provide an electric power supply system which supplies electric power between a vehicle provided with a vehicular power source and a house provided with a household power source in both directions according to a plug-in power supply and a plug-out power supply by effectively utilizing electric power supplied from the vehicular power source in the vehicle and the household power source in the house, while appropriately adjusting a temperature of the vehicular power source such as a fuel cell or a battery.

To attain an object described above, there is provided an electric power supply system between a vehicle and a house comprising: a power source connecting element configured to have a detachable connection between a vehicular power source disposed in the vehicle and a household power source disposed in the house for an electric power supply in both directions; a vehicular power state detecting element configured to detect a vehicular power state; a household power state detecting element configured to detect a household power state; and a power supply controlling element configured to switch a plug-out power supply which supplies electric power from the vehicular power source to the house and a plug-in power supply which supplies electric power from the household power source to the vehicle on the basis of the vehicular power state detected by the vehicular power state detecting element and the household power state detected by the household power state detecting element when the vehicular power source disposed in the vehicle and the household power source disposed in the house have been connected by the power source connecting element for electric power supply in both directions.

According to the present invention, the plug-out power supply which supplies electric power from the vehicular power source to the house and the plug-in power supply which supplies electric power from the household power source to the vehicle are switched by the power supply controlling element according to the vehicular power state and the household power state.

By switching the slug-out power supply and the plug-in power supply, the vehicular power source and the household power source can compensate each other to make effective use of the electric power supplied therefrom. Moreover, adjusting appropriately the temperature of the vehicular power source can contribute to stabilizing the performance of the vehicular power source.

In the present invention, the vehicular power source is a fuel cell, and the power supply controlling element performs the plug-out power supply to supply a generated power from the fuel cell to the house when a warm-up operation which increases a temperature of the fuel cell according to the power generation of the fuel cell is detected by the vehicular power state detecting element to be on operation.

Conventionally, electric power is needed to perform the warm-up operation for the fuel cell and the electric power is generated in the warm-up operation. Thus, if the generated electric power cannot be consumed by electric accessory devices disposed in the vehicle, it is necessary to dispose a resistor with a greater rated power for converting the generated electric power to heat in the vehicle in order to consume the electric power. As a result thereof, the electric power generated by the fuel cell is consumed in vain, and the provision of the resistor with a greater rated power would increase component-mounting space and component cost.

Thus, the power supply controlling element supplies the generated electric power from the fuel cell to the house to be consumed in the house. According thereto, the generated electric power from the fuel cell can be utilized to operate electric loads in the house such as electric home appliances or can be sold to an electric power company. Thereby, the generated electric power from the fuel cell can be effectively utilized. Moreover, by replacing a resistor with a greater rated power for consuming the generated electric power from the fuel cell with another resistor with a smaller rated power in the vehicle, it is expected to reduce the component-mounting space and the component cost.

In the present invention, the vehicle is an electric vehicle provided with a motor to drive a driving wheel; the vehicular power source is an electric accumulator; and the power supply controlling element performs the plug-out power supply to supply a discharged power from the electric accumulator to the house when a warm-up operation which increases a temperature of the electric accumulator according to the power discharging of the electric accumulator is detected to be on operation by the vehicular power state detecting element.

According to the present invention, electric power is needed to perform the warm-up operation for the electric accumulator and the electric power is discharged in the warm-up operation. Thus, if the discharged electric power cannot be consumed by the electric accessory devices disposed in the vehicle, it is necessary to dispose a resistor with a greater rated cower for converting the discharged electric power to heat in the vehicle in order to consume the electric power. As a result thereof, the electric power discharged by the electric accumulator is consumed in vain, and the provision of the resistor with a greater rated power would increase component-mounting space and component cost.

Thus, the power supply controlling element supplies the discharged electric power from the electric accumulator to the house to be consumed in the house. According thereto, the discharged electric power from the electric accumulator can be utilized to operate electric loads in the house such as electric home appliances or can be sold to an electric power company. Thereby, the discharged electric power from the electric accumulator can be effectively utilized. Moreover, by replacing a resistor with a greater rated power for consuming the discharged electric power from the electric accumulator with another resistor with a smaller rated power in the vehicle, it is expected to reduce the component-mounting space and the component cost.

In the present invention, the vehicle is a hybrid electric vehicle provided with a motor and an engine to drive a driving wheel; the vehicular power source is an electric accumulator; and the power supply controlling element performs the plug-out power supply to supply a discharged power from the electric accumulator or a generated power from the motor which is driven by the engine to serve as a power generator to the house when a first warm-up operation which increases a temperature of the electric accumulator according to the power discharging of the electric accumulator or a second warm-up operation which increases the temperature of the electric accumulator according to the power charging by the generated power from the motor is detected to be on operation by the vehicular power state detecting element.

According to the present invention, electric power is needed to perform the first warm-up operation or the second warm-up operation for the fuel cell and the electric power is generated according to the discharging of electric power in the first warm-up operation or the generation of electric power in the second warm-up operation. Thus, if the generated electric power cannot be consumed by electric accessory devices disposed in the vehicle, it is necessary to dispose a resistor with a greater rated power for converting the generated electric power to heat in the vehicle to consume the electric power. As a result thereof, the electric power discharged from the electric accumulator and the electric power generated from the motor are consumed in vain, and the provision of the resistor with a greater rated power would increase the component-mounting space and the component cost.

Thus, the power supply controlling element supplies the electric power discharged from the electric accumulator and the electric power generated from the house to be consumed in the house. According thereto, the electric power discharged from the electric accumulator and the electric power generated from the motor can be utilized to operate electric loads in the house such as electric home appliances or can be sold to an electric power company. Thereby, the electric power discharged from the electric accumulator and the electric power generated from the motor can be effectively utilized. Moreover, by replacing a resistor with a greater rated power for consuming the generated electric power from the fuel cell with another resistor with a smaller rated power in the vehicle, it is expected to reduce the component-mounting space and the component cost.

In the present invention, the power supply controlling element performs the plug-out power supply to supply the electric power from the vehicular power source to the house to compensate the shortage of output power from the household power source when the voltage of the output power from the household power source is detected to be equal to or lower than a predefined level by the household power state detecting element.

According to the present invention, when the output voltage a household power source is decreased due to increment of consumed electric power or electric power failure in the house, the shortage of output power from the household power source can be compensated by performing the plug-out power supply.

In the present invention, the vehicle is provided with a shift position detecting element configured to determine whether or not a shift lever is set at a position of parking, a motor configured to drive a driving wheel, and a switching element configured to switch on and off the electric power supply to the motor; and the electric power supply system further includes a power connection permitting element configured to permit the connection between the vehicular power source disposed in the vehicle and the household power source disposed in the house for the electric power supply in both directions by the power source connecting element on condition that the shift lever is detected to be set at the position of parking by the shift position detecting element and the electric power supply to the motor is switched off by the switching element.

According to the present invention, when the shift lever of the vehicle is set at the position of parking and the electric power supply to the motor is switched off by the switching element, it is impossible to run the vehicle at the moment. According to the present invention, the connection between the vehicular power source disposed in the vehicle and the household power source disposed in the house for the electric power supply in both directions by the power source connecting element is permitted by the power connection permitting element on condition that the vehicle is unable to be run. Thereby, the vehicle can be undoubtedly prevented from being run by mistake when the vehicle and the house are connected by the power source connecting element.

DETAILED DESCRIPTION OF THE PREFERRED EMBODIMENTS

Hereinafter, an embodiment of the present invention will be described in detail with reference to FIG. 1 to FIG. 7. FIG.

Figure 1:
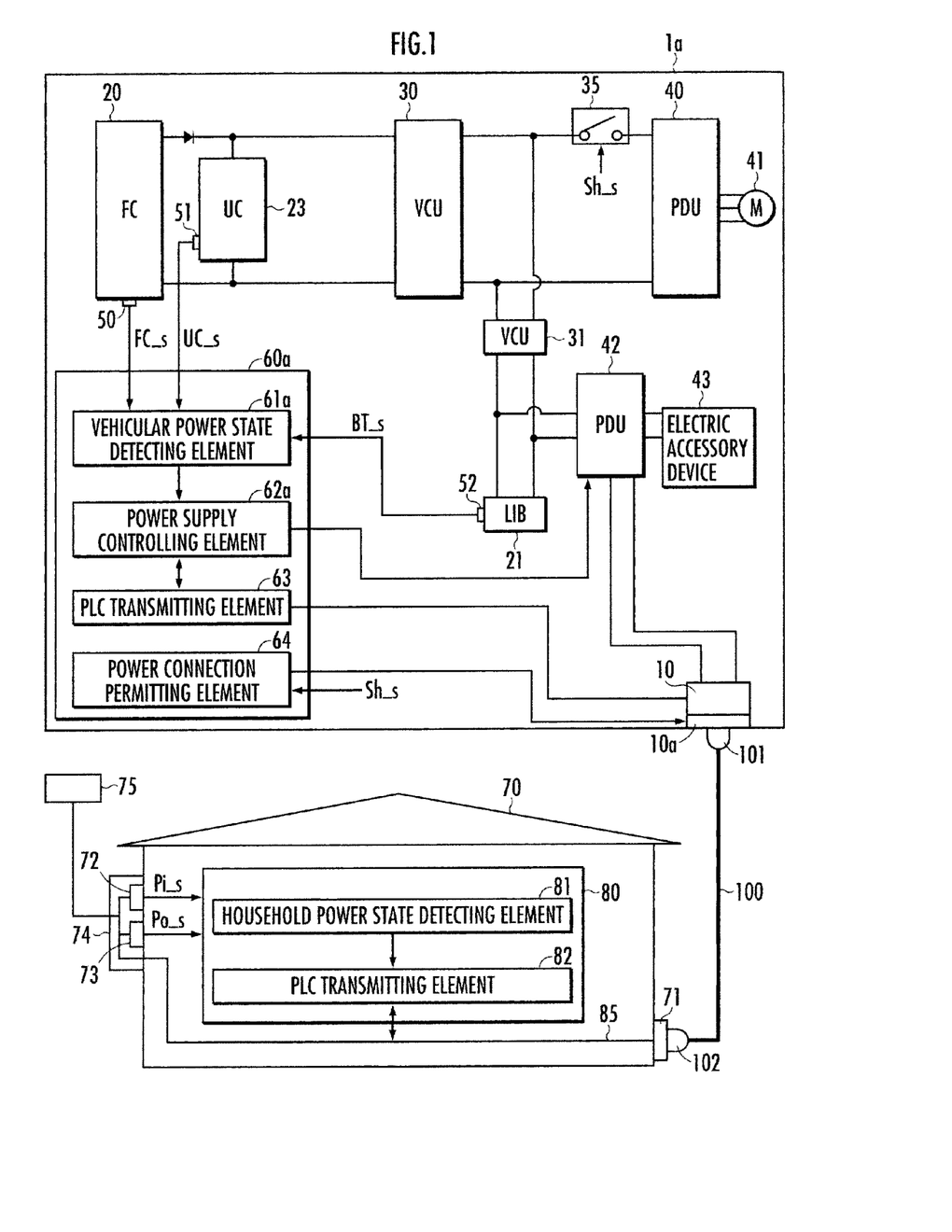
FIG. 1 is a diagram illustrating an overall configuration of an electric power supply system between a fuel cell vehicle and a house.

1 illustrates an overall configuration of an electric power supply system between a vehicle and a house when the present invention is applied to a fuel cell vehicle.

Referring to FIG. 1, the fuel cell vehicle 1a is provided with a vehicular power source including a fuel cell 20, a battery (for example, a lithium ion battery) and a capacitor 23. Electric power from the vehicular power source is supplied to a motor 41 which is connected with a driving wheel (not shown) as a driving power through a PDU (Power Drive Unit) 40.

The fuel cell vehicle 1a is further provided with a DC/DC converter 30 connected between the PDU 40 and a location aside the fuel cell 20 and the capacitor 23, a DC/DC converter 31 connected between the battery 21 and a location between the DC/DC converter 30 and the PDU 40; a PDU 42 connected between an electric accessory device 43 and a location between the DC/DC converter 31 and the battery 21, a motor switch 35 (corresponding to a switching element of the present invention) for switching electric power supply to the PDU 40, a plug receptacle 10 (corresponding to a power source connecting element of the present invention), a movable cover 10a for exposing or covering the plug receptacle 10, and a controller 60a for controlling electric power supply between the fuel cell vehicle 1a and the house 70. Herein, the electric accessory device 43 may be, for example, a reactant gas supplying device for supplying reactant gases to the fuel cell 20, an air conditioner, or a water pump for circulating coolants in a coolant circulation circuit to heat or cool the fuel cell 20.

The fuel cell 20 is provided with a fuel cell sensor 50 for detecting a state of the fuel cell 20. The state of the fuel cell 20 includes, for example, a temperature, a terminal voltage, an output current, and a supply pressure of reactant gases (hydrogen and air in the present embodiment) for the fuel cell 20.

The battery 21 is provided with a battery sensor 52 for detecting a temperature, a terminal voltage, an output current and the like for the battery 21. Similarly, the capacitor 23 is provided with a capacitor sensor 51 for detecting a temperature, a terminal voltage, an output current and the like for the capacitor 23.

The controller 60a is an electronic unit composed of a microcomputer (not shown) and the like. By causing microcomputer to execute a control program configured to supply electric power between the fuel cell vehicle 1a and the house 70, the controller 60a functions as a vehicular power state detecting element 61a, a power supply controlling element 62a, a PLC (Power Line Carrier, Power Line Communication) transmitting element 63, and a power connection permitting element 64.

Detection signals FC_s on the temperature, the terminal voltage, the output current, the supply pressure of reactant gases and the like detected by the fuel cell sensor 50 for the fuel cell 20, detection signals UC_s on the temperature, the terminal voltage, the output current and the like detected by the capacitor sensor 51 for the capacitor 23, and detection signals BT_s on the temperature, the terminal voltage, the output current and the like detected by the battery sensor 52 for the battery 21 are input into the controller 60a.

The operations of the DC/DC converters 30 and 31, the PDU 42, the motor switch 35, the movable cover 10a, the reactant gas supplying device, the water pump and the like are controlled according to control signals output from the controller 60a, respectively.

The vehicular power state detecting element 61a detects the temperature, the terminal voltage, the output current, the generated power source and the like for the fuel cell 20 according to the detection signals FC_s output from the fuel cell sensor 50; detects the temperature, the terminal voltage, the output current, SOC (State of Charge: the percentage of residual charge amount when the full-charged amount is denoted as 100%) and the like for the capacitor 23 according to the detection signals UC_s output from the capacitor sensor 51; and detects the temperature, the terminal voltage, the output current, the SOC and the like for the battery 21 according to the detection signals BT_s output from the battery sensor 52. The power supply controlling element 62a, on the basis of the state of the fuel cell 20 and the battery 21 detected by the vehicular power state detecting element 61a and the state of a commercial power source in the house 70 detected by a household power state detecting element 81 (to be described hereinafter), switches a plug-in power supply which supplies electric power from the house 70 to the fuel cell vehicle 1a via a power cable 100 and a plug-out power supply which supplies electric power from the fuel cell vehicle 1a to the house 70 via the power cable 100.

The PLC (Power Line Communication) transmitting element 63 performs communications by using electric power lines including the power cable 100 to carry data signals between the controller 60a disposed in the fuel cell vehicle 1a and a controller 80 (to be described hereinafter) disposed in the house 70.

On condition that a shift lever (not shown) is determined to be at the position of parking P according to detection signals Sh_s output from a shift position sensor (not shown) configured to detect a position of the shift lever, the power connection permitting element 64 opens the movable cover 10a by turning off the motor switch 35 (disconnected state) when an open operation is performed by a driver on the movable cover 10a covering the plug receptacle 10.

The above-mentioned controller 80 which is disposed in the house 70 is an electronic unit composed of a microcomputer (not shown) and the like. By causing the microcomputer to execute a control program configured to supply electric power between the fuel cell vehicle 1a and the house 70, the controller 80 functions as the above-mentioned household power state detecting element 81 and a PLC transmitting element 82.

The controller 80 is connected with the commercial power source 75 through a switch box 74 having a power usage meter 72 and a power selling meter 73. The switch box 74 distributes electric power supplied from the commercial power source 75 to power outlets disposed in the house 70. The switch box 74 corresponds to a household power source provided in the house in the present invention. A connection portion between the switch box 74 and the commercial power source 75 is connected with a power outlet 71 by a power line 85.

The household power state detecting element 81 detects the state of the commercial power source 75 in the house 70 according to detection signals Pi_s on the voltage, the power usage and one like of the commercial power source 75 output from the power usage meter 72 and detection signals Po_s on the electric power sold output from the power selling meter 73. The PLC transmitting element 82 performs communications with the fuel cell vehicle 1a by using the power line 85 to carry data signals.

Hereinafter, with reference to the charts illustrated in FIG. 2 to FIG. 5, descriptions will be carried out on processes performed respectively by the power supply controlling lenient 62a and the power connection permitting element 64.

Figure 2:
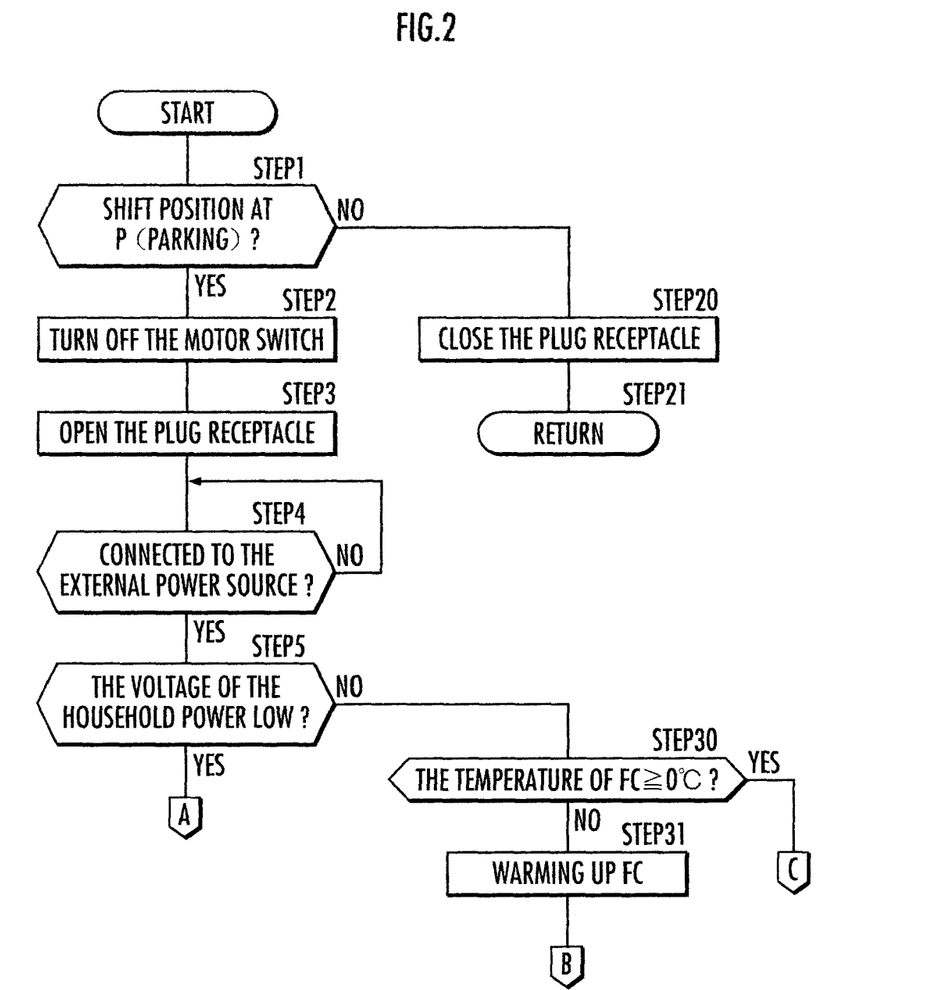
FIG. 2 is a flow chart illustrating a permission process on a connection between the fuel cell vehicle and the house and a determination process on a plug-out power supply from the fuel cell vehicle to the house.

STEP 1 to STEP 4 and STEP 20 to STEP 21 in FIG. 2 are performed by the power connection permitting element 64. At STEP 1, when an open switch (not shown) of the movable cover 10a disposed in the fuel cell vehicle 1a is operated by a user (driver) of the fuel cell vehicle 1a, the power connection permitting element 64 determines whether or not the shift lever is at the position of P (parking) according to the detection signals Sh_s output from the shift position sensor. When the shift lever is positioned at P, the fuel cell vehicle 1a is in a state of being braked by a mechanical brake.

When the shift lever is determined to be positioned at P, the process moves to STEP 2 where the power connection permitting element 64 stops supplying electric power to the PDU 40 by switching off the motor switch 35. Accordingly, the fuel cell vehicle 1a is halted by the mechanical brake and the driving wheels thereof are unable to be driven by the motor 41.

As mentioned, when the fuel cell vehicle 1a is halted by the mechanical brake and the driving wheels thereof are unable to be driven by the motor 41, the process moves to STEP 3 where the power connection permitting element 64 opens the movable cover 10a. Accordingly, it is possible for the plug 101 of the power cable 100 to be inserted to the plug receptacle 10.

On the other hand, when the shift lever is determined not to be at the position of P at STEP 1, the process diverges to STEP 20 where the power connection permitting element 64 maintains the plug receptacle 10 as being covered by the movable cover 10a as it was. Thereafter, the process moves to STEP 21 and the process is terminated. In this case, the plug 101 is prohibited from being inserted to the plug receptacle 10 by the user.

The process after STEP 4 is performed by the power supply controlling element 62a. At STEP 4, the power supply controlling element 62a confirms whether or not the PLC transmission is enabled between the controller 60a disposed in the fuel cell vehicle 1a and the controller 80 disposed in the house 70. According to the confirmation result, the power supply controlling element 62a determines whether or not the plug receptacle 10 provided in the fuel cell vehicle 1a and the power outlet 71 disposed in the house 70 are connected by the power cable 100.

If the plug receptacle 10 provided in the fuel cell vehicle 1a and the power outlet 71 disposed in the house 7C is determined to have been connected, the process moves to STEP 5 where the power supply controlling element 62a determines whether or not the voltage of the commercial power source 75 in the house 70 is equal to or lower than a predefined low voltage level (for example, 85% of the output voltage of a normal commercial power source, or the upper limit of contracted power in a house is predicted to have been reached) according to data signals sent from the household power state detecting element 81 through the PLC transmitting element 82.

Figure 3:
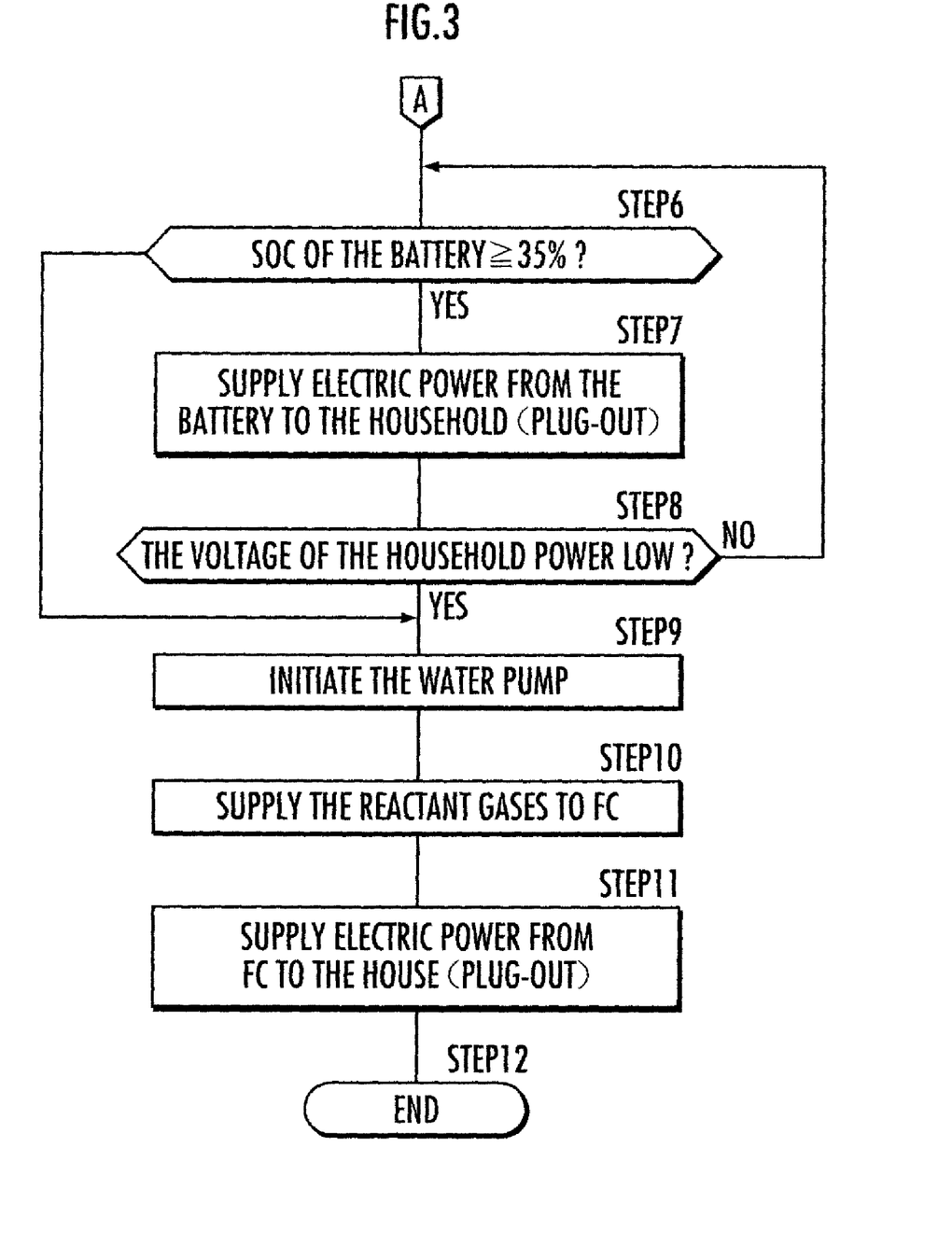
FIG. 3 is a flow chart illustrating the plug-out power supply from the fuel cell vehicle to the house.

If the voltage of the commercial power source 75 in the house 70 is determined to be equal to or lower than the predefined low voltage level, the process moves to STEP 6 in FIG. 3. On the other hand, if the voltage of the commercial power source 75 in the house 70 is determined to be greater than the predefined low voltage level, the process diverges to STEP 30 where the power supply controlling element 62a determines whether or not the temperature of the fuel cell 20 detected by the vehicular power state detecting element 61a is equal to or higher than 0° C.

Figure 5:
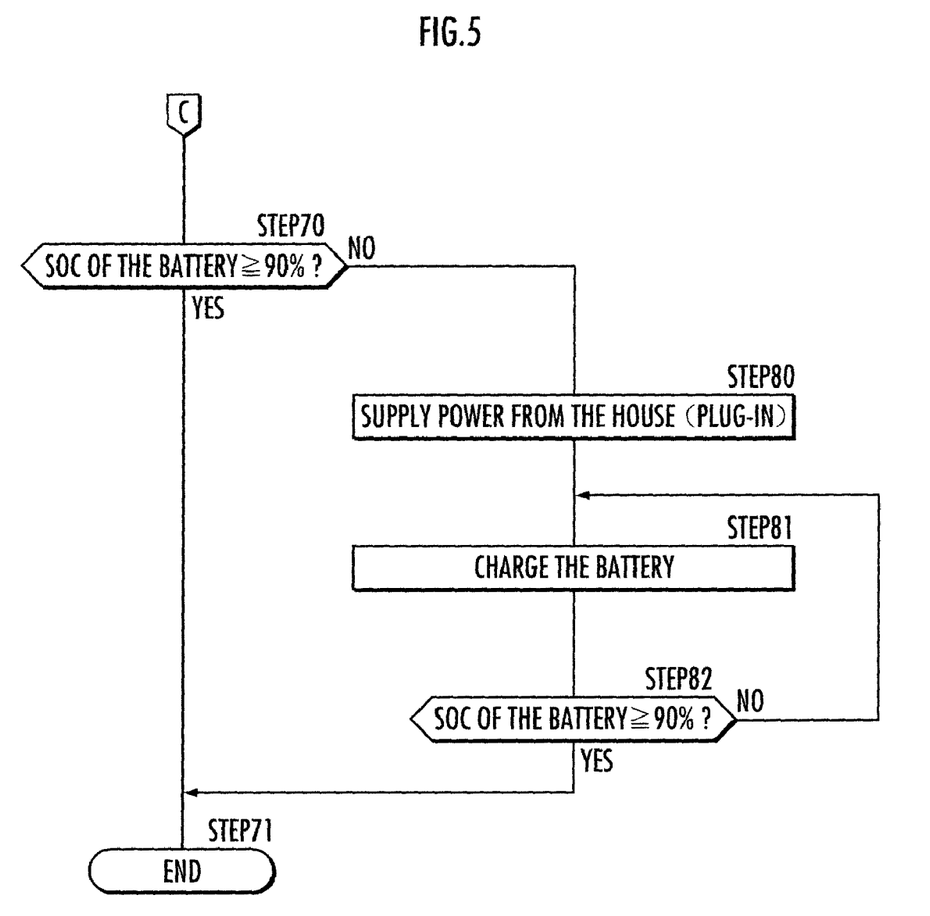
FIG. 5 is a flow chart illustrating a charging process on a battery with electric power supplied from the house to the fuel cell vehicle according to a plug-in power supply.

If the temperature of the fuel cell 20 is determined to be equal to or higher than 0° C. (in this case, the warm-up operation is not needed to be performed on the fuel cell 20), the process diverges to STEP 70 in Fin. 5 where the power supply controlling element 62a determines whether or not it is necessary to charge the battery 21 and charges the battery 21 if it is needed. On the other hand, if the temperature of the fuel cell 20 is determined to be lower than 0° C. (in this case, the warm-up operation is necessary for the fuel cell 20), the process moves to STEP 31 where the power supply controlling element 62a initiates the warm-up operation for the fuel cell 20 and the process moves to STEP 6 in FIG. 3. STEP 6 to STEP 11 in FIG. 3 illustrate the warm-up operation for the fuel cell 20.

Hereinafter, with reference to FIG. 3, descriptions will be carried out on process performed when the voltage of the commercial power source 75 in the house 70 is determined to be equal to or lower than the predefined low voltage level.

At STEP 6, the power supply controlling element 62a determines whether or not the SOC of the battery 21 detected by the vehicular power state detecting element 61a is equal to or greater than 35%. If the SOC of the battery 21 is determined to be equal to or greater than 35%, the process moves to STEP 7 where the power supply controlling element 62a controls the PDU 42 to generate electric power with a specification same as the output power from the commercial power source 75 by using the output power from the battery 21 and output it to the plug receptacle 10. Accordingly, the output power from the battery 21 is supplied to the house 70 through the PDU 42 (the plug-out power supply) to assist the power supply by the commercial power source 75 in the house 70.

While the electric power generated from the output power from the battery 21 with the same specification as the commercial power source 75 is being supplied, if the voltage of the commercial power source 75 in the house 70 is determined to be greater than the predefined low voltage level at STEP 8, the plug-out power supply is sufficient. Therefore, the process returns to STEP 6, the power supply controlling element 62a continues the plug-out power supply according to only the output power from the battery 21.

On the other hand, if the voltage of the commercial power source 75 in the house 70 is determined to be lower than the predefined low voltage level at STEP 8, the plug-out power supply is insufficient. Thus, the process moves to STEP 9, the power supply controlling element 62a initiates the water pump, and at STEP 10, the power supply controlling element 62a starts supplying the reactant gases to the fuel cell 20 through the electric accessory device 43.

At STEP 11, the power supply controlling element 62a controls the PDU 42 to generate an electric power with the same specification as the output power from the commercial power source 75 by using the output power from the fuel cell 20 and output it to the plug receptacle 10. Accordingly, the output power from the fuel cell 20 is supplied to the house 70 through the PDU 42 (the plug-out power supply) to assist the power supply by the commercial power source 75 in the house 70. Thereafter, the process moves to STEP 12 and is terminated by the power supply controlling element 62a.

Figure 4:
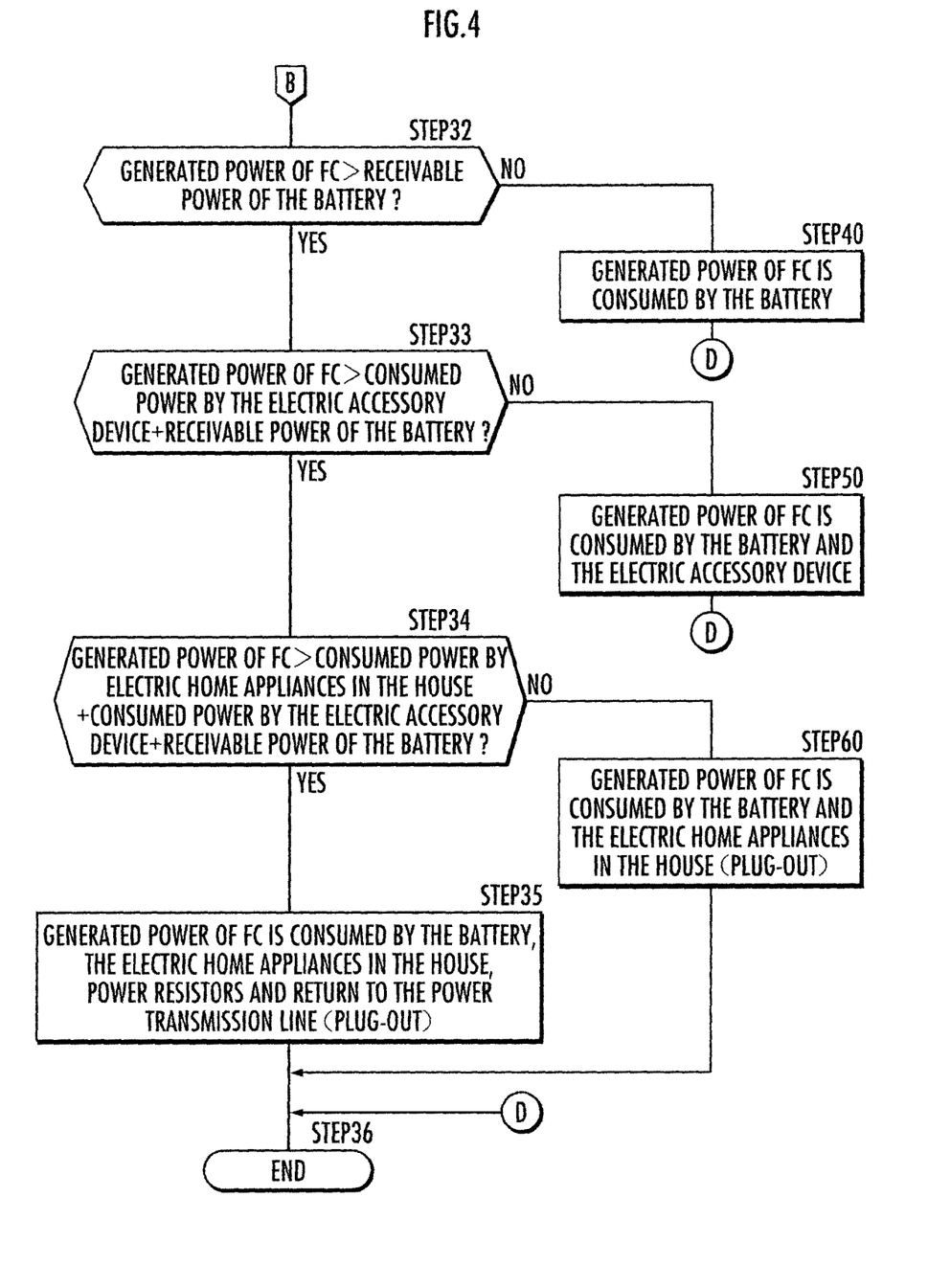
FIG. 4 is a flow chart illustrating a consumption process on electric power generated from a fuel cell in a warm-up operation.

Hereinafter, the warm-up operation of the fuel cell 20 will be explained with reference to FIG. 4.

At STEP 32, the power supply controlling element 62a determines whether or not the generated power (warm-up electric power) of the fuel cell 20 detected by the vehicular power state detecting element 61a is greater than the receivable power (maximum chargeable electric power) of the battery 21 detected by the vehicular power state detecting element 61a. The warm-up operation is performed on the fuel cell 20 for 10 to 60 seconds with the generated power of the fuel cell 20 set at 10 to 30 kW, for example.

If the generated power from the fuel cell 20 is equal to or less than the receivable power of the battery 21, the generated power from the fuel cell 20 can be completely consumed by battery 21 for charging. In this case, the process diverges to STEP 40 where the power supply controlling element 62a charges the battery 21 using the generated power from the fuel cell 20. Thereafter, the process moves to STEP 36 and is terminated by the power supply controlling element 62a.

On the other hand, if the generated power from the fuel cell 20 is greater than the receivable power of the battery 21, the generated power from the fuel cell 20 cannot be consumed the battery 21 for charging only. In this case, the process moves to STEP 33 where the cower supply controlling element 62a determines whether the generated power from the fuel cell 20 is greater than the sum of the consumed power by the electric accessory device 43 and the receivable power of the battery 21.

If the generated power from the fuel cell 20 is equal to or less than the sum of the consumed power by the electric accessory device 43 and the receivable power of the battery 21, the generated power from the fuel cell 20 can be completely consumed by the electric accessory device 43 and the battery 21. In this case, the process diverges to STEP 50 where the power supply controlling element 62a distributes the generated power from the fuel cell 20 to the electric accessory device 43 for consumption and the battery 21 for charging. Thereafter, the process moves to STEP 36 and is terminated by the power supply controlling element 62a.

On the other hand, if the generated power from the fuel cell 20 is greater than the sum of the consumed power by the electric accessory device 43 and the receivable power of the battery 21, the generated power from the fuel cell 20 cannot be consumed by the electric accessory device 43 and by the battery 21 through charging.

In this case, the process moves to STEP 34 where the power supply controlling element 62a determines whether or not the generated power from the fuel cell 20 is greater than the sum of the consumed power by electric home appliances in the house 70 (corresponding to the electric load of the present invention) and the consumed power by the electric accessory device 43 and the receivable power of the battery 21.

If the generated power from the fuel cell 20 is equal to or less than the sum of the consumed power by the electric home appliances in the house 70 and the consumed power by the electric accessory device 43 and the receivable power of the battery 21, he generated power from the fuel cell 20 can be completely consumed by the electric home appliances in the house 70 and the electric accessory device 43 and by the battery 21 through charging.

In this case, the process diverges to STEP 60 where the power supply controlling element 62a controls the PDU 42 to generate an electric power with the same specification as the output power from the commercial power source 75 by using a part of the output power from the fuel cell 20 and output it to the plug receptacle 10. Accordingly, a part of the output power from the fuel cell 20 is supplied to the house 70 through the PDU 42 (the plug-out power supply) to be consumed effectively by the electric home appliances in the house 70. Thereafter, the process moves to STEP 36 and is terminated by the power supply controlling element 62a.

On the other hand, if the generated power from the fuel cell 20 is greater than the sum of the consumed power by the electric home appliances in the house 70 and the consumed power by the electric accessory device 43 and the receivable power of the battery 21 at STEP 34, the generated power from the fuel cell 20 cannot be completely consumed by the electric home appliances in the house 70 and the electric accessory device 43 and by the battery 21 through charging.

In this case, the process moves to STEP 35 where the power supply controlling element 62a distributes the generated power from the fuel cell 20 to the battery 21 for charging, the electric accessory device 43 and the electric home appliances in the house 70 for consumption, to a resistor (not shown) connected between the output terminals of the fuel cell 20 for consumption, and a return (power selling) from the house 70 to the commercial power line (of AC 100V, for example). Thereafter, the process moves to STEP 36 and is terminated by the power supply controlling element 62a.

Hereinafter, with reference to FIG. 5, the charging process for the battery 21 will be explained.

At STEP 70, the power supply controlling element 62a determines whether or not the SOC of the battery 21 detected by the vehicular power state detecting element 61a is equal to or greater than 90%.

If the SOC of the battery 21 is determined to be equal to or greater than 90%, the battery 21 has sufficient charged power, and the process moves to STEP 71 where the power supply controlling element 62a ends the process without charging the battery 21.

On the other hand, if the SOC of the battery 21 is determined to be less than 90% at STEP 70, the process diverges to STEP 80 where the power supply controlling element 62a controls the PDU 42 to convert the electric power supplied from the house 70 via the power cable 100 into power to be provided to the battery 21. Accordingly, the bower supply controlling element 62a charges the battery 21 at STEP 81. When the SOC of the battery becomes equal to or greater than 90% at the subsequent STEP 82, the process moves to STEP 71 where the power supply controlling element 62a ends the process.

In the present embodiment, the fuel cell 20 and the lithium battery 21 are given as specific examples of the vehicular power sources of the present invention. However, a capacitor or a battery of the other kinds mounted in a vehicle may be used as the vehicular power source to supply electric power between the vehicle and a house according to the present invention.

In the present embodiment, when the warm-up operation is being performed on the fuel cell, the generated power according to the power generation of the fuel cell is supplied to the house and consumed by the electric home appliances in the house. However, even without the mentioned processes, the effect of the present invention can be obtained.

In the present embodiment, the fuel cell vehicle mounted with a fuel cell is given as an example of the vehicle of the present invention. However, it is also acceptable to use any vehicle provided with a power source, such as an electric vehicle or a hybrid electric vehicle, as the vehicle of the present invention.

Hereinafter, an embodiment where an electric vehicle or a hybrid electric vehicle is used as the vehicle of the present invention will be explained.

first, an embodiment where an electric vehicle 1b is applied in the present invention will be explained with reference to FIG. 6.

Figure 6:
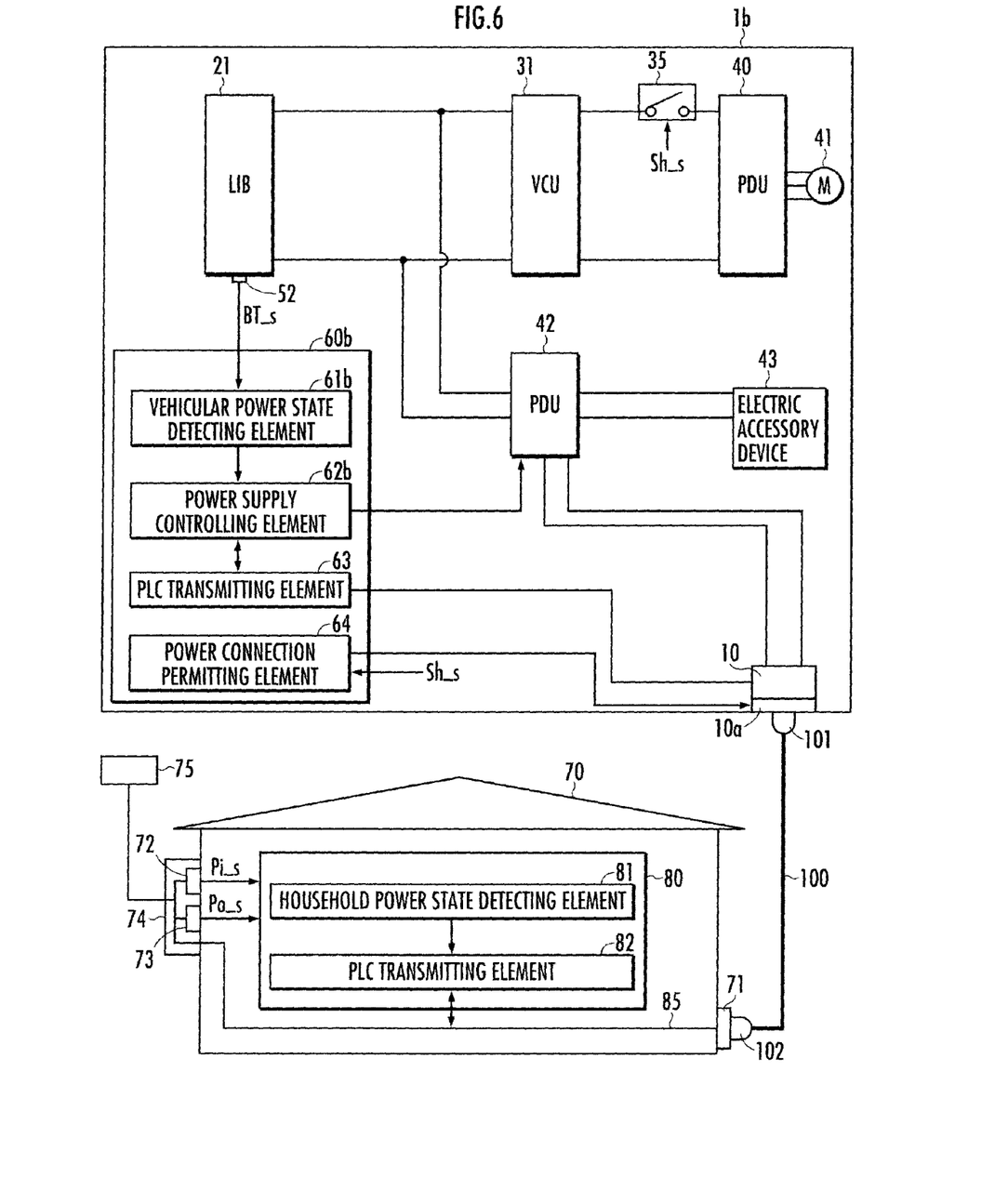
FIG. 6 is a diagram illustrating an overall configuration of an electric power supply system between an electric vehicle and a house.

FIG. 6 illustrates an overall configuration of an electric power supply system between the electric vehicle (EV) 1b and a house. The same numerals are used to refer to the same or identical parts in the aforementioned embodiment related to the fuel cell vehicle 1a in FIG. 1 and descriptions thereof are omitted.

The electric vehicle 1b is provided with a battery 21 (for example, a lithium battery equivalent to the electric accumulator of the present invention) serving as the vehicular power source of the present invention. According to the electric power supplied from the battery 21, the PDU 40 provides the driving power to drive the motor 41.

The controller 60b is an electronic unit composed of a microcomputer (not shown) and the like. By causing the microcomputer to execute a control program configured to supply electric power between the electric vehicle 1b and the house 70, the controller 60b functions as a vehicular power state detecting element 61b, a power supply controlling element 62b, a PLC transmitting element 63, and a power connection permitting element 64.

Detection signals BT_s on the temperature, the terminal voltage, the output current and the like detected by the battery sensor 52 for the battery 21 are input into the controller 60b. The operations or the DC/DC converter 31, the PDU 42, the motor switch 35, the movable cover 10a and the like are controlled according to control signals output from the controller 60b, respectively.

The vehicular power state detecting element 61b detects the temperature, the terminal voltage, the output current, the SOC and the like for the battery 21 according to the detection signals BT_s output from the battery sensor 52. The power supply controlling element 62b, on the basis of the state of the battery 21 detected by the vehicular power state detecting element 61b and the state of the commercial power source in the house 70 detected by the household power state detecting element 81, switches the plug-in power supply and the plug-out power supply.

When the plug receptacle 10 disposed in the electric vehicle 1b and the power outlet 71 disposed in the house 70 are connected by the power cable 100, the power supply controlling element 62b performs the plug-in power supply if the SOC of the battery 21 is less than 90%. Accordingly, the battery 21 is charged by the electric power supplied from the house 70.

When the battery 21 is charged, the temperature thereof will rise accordingly. Therefore, by charging the battery 21, the power supply controlling element 62b can increase the SOC of the battery 21 and meanwhile can warm up the battery 21.

When the SOC of the battery 22 reaches close to 100% where the battery 21 cannon be charged any further, the power supply controlling element 62b performs the plug-out power supply by discharging the battery 21 when the temperature of the battery 21 becomes equal to or lower than a predefined lower limit to supply the discharged power from the battery 21 to the house 70. Meanwhile, the battery is heated according to the discharging (the warm-up operation of the battery 21).

Hereinafter, an embodiment where a hybrid electric vehicle 1c is applied in the present invention will be explained with reference to FIG. 7.

Figure 7:
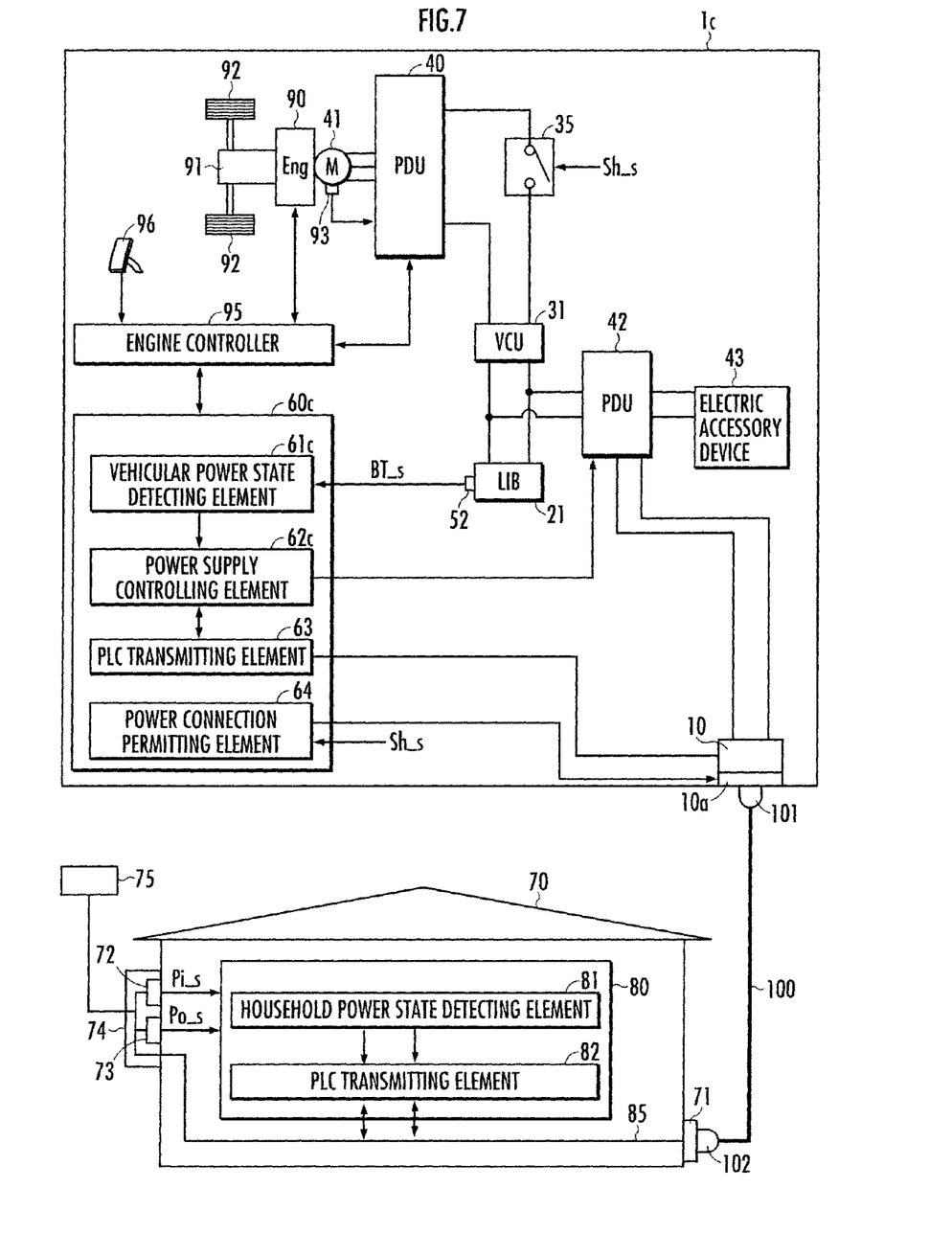
FIG. 7 is a diagram illustrating an overall configuration of an electric power supply system between a hybrid electric vehicle and a house.

FIG. 7 illustrates an overall configuration of an electric power supply system between the hybrid electric vehicle (HEV) 1c and a house. The same numerals are used to refer to the same or identical parts in the aforementioned embodiment related to the fuel cell vehicle 1a in FIG. 1 and descriptions thereof are omitted.

The hybrid electric vehicle 1c is provided with a battery 21 (for example, a lithium battery equivalent to the electric accumulator of the present invention) serving as the vehicular power source of the present invention. According to the electric power supplied from the battery 21, the PDU 40 provides the driving power to drive the motor 41.

A revolution shaft of the motor 41 is directly linked to a revolution shaft of en engine 90, therefore, the driving force from the engine 90 and the motor 41 is transmitted to wheels 92 and 92 through a transmission 91.

The motor 41 operates as a three-phase alternating current motor and a power generator. When the engine 90 is stopped, the driving force from the motor 41 is transmitted to the wheels 92 through the transmission 91. When the engine 90 is running, the motor 41 is rotated by the engine 90, which makes the motor 41 function as a power generator.

An engine controller 95 is an electric unit composed of a microcomputer (not shown) and the like. Detection signals on a revolution number of the engine 90, a negative pressure of an intake, a water temperature and the like from the engine 90 and detection signals on stepped angles of an accelerator pedal 96 are input into the engine controller 95. The engine controller 95 calculates an amount of fuels supplied to the engine 90 or an ignition timing according to the detection signals and outputs control signals on the fuel supply and the ignition timing to the engine 90.

The engine controller 95 also controls operations of the motor 41. The engine controller 95 outputs control signals for defining the output from the motor 41 to the PDU 40. Further, instruction signals for defining an amount of power generated from the motor 41 is output from the controller 60c to the engine controller 95. According to the instruction signals, the engine controller 95 outputs control signals on the fuel supply and on the ignition timing to the engine 90.

The motor 41 is provided with a rotor angle sensor 93. The PDU 40, on the basis of detected rotor angles from the rotor angle sensor 93, outputs a driving voltage to drive the motor 41 and converts the generated electric bower from the motor 41 to direct-current power.

The controller 60c is an electronic unit composed of a microcomputer (not shown) and the like. By causing the microcomputer to execute a control program configured to supply electric power between the hybrid electric vehicle 1c and the house 70, the controller 60c functions as a vehicular power state detecting element 61c, a power supply controlling element 62c, a PLC transmitting element 63, and a power connection permitting element 64.

Detection signals BT_s on the temperature, the terminal voltage, the output current and the like detected by the battery sensor 52 for the battery 21 are input into the controller 60c. The operations of the DC/DC converter 31, the PDU 42, the motor switch 35, the movable cover 10a and the like are controlled according to control signals output from the controller 60c, respectively.

The vehicular power state detecting element 61c detects the temperature, the terminal voltage, the output current, the SOC and the like for the battery 21 according to the detection signals BT_s output from the battery sensor 52. The power supply controlling element 62c, on the basis of the state of the battery 21 detected by the vehicular power state detecting element 61c and the state of the commercial power source in the house 70 detected by the household power state detecting element 81, switches the plug-in power supply and the plug-out power supply.

When the plug receptacle 10 disposed in the hybrid electric vehicle 1c and the power outlet 71 disposed in the house 70 are connected by the power cable 100, the power supply controlling element 62c performs the plug-in power supply if the SOC of the battery 21 is less than 90%. Accordingly, the battery 21 is charged by the electric power supplied from the house 70.

The temperature of the battery 21 rises due to the charging. Therefore, by charging the battery 21, the power supply controlling element 62c can increase the SOC of the battery 21 and meanwhile can warm up the battery 21.

When the SOC of the battery 21 reaches close to 100% and the battery 21 cannot be charged any further, the power supply controlling element 62c performs the plug-out power supply by discharging the battery 21 when the temperature of the battery 21 becomes equal to or lower than a predefined lower limit supply the discharged power from the battery 21 to the house 70.

Meanwhile, the battery 21 is heated according to the discharging (first warm-up operation of the battery 21).

Moreover, when the SOC of the battery 21 is too low to heat the battery 21 by discharging and the house 70 cannot afford sufficient electric power to charge the battery 21 according to the plug-in power, the power supply controlling element 62*c* initiates engine 90 to operate the motor 41 as a power generator. Therefore, the power supply controlling element 62*c* can charge the battery 21 according to the electric power generated from the motor 41, and meanwhile, supplies a part the generated electric power by the motor 41 to the house 70 according to the plug-out power supply (second warm-up operation of the battery 21).

According thereto, the battery 21 can be heated through charging, and meanwhile, the power supply by the commercial power source 75 to the house 70 can be assisted according to the plug-out power supply.

In the present embodiment, the system is explained as including a power connection permitting element which permits the connection of a vehicle and a house through a power cable when the shift lever of the vehicle is set at the position of P (parking) and the electric power supply to the motor is switched off. The present invention is not limited thereto. The effect of the present invention can be achieved without providing the power connection permitting element.

What is claimed is:

1. An electric power supply system between a vehicle and a house comprising:
 a power source connecting element configured to have a detachable connection between a vehicular power source disposed at the vehicle and a household power source disposed at the house for an electric power supply in both directions;
 a vehicular power state detecting element configured to detect a vehicular power state;
 a household power state detecting element configured to detect a household power state; and
 a power supply controlling element configured to switch a first state in which electric power is supplied from the vehicular power source to the house and a second state in which electric power is supplied from the household power source to the vehicle, on the basis of the vehicular power state detected by the vehicular power state detecting element and the household power state detected by the household power state detecting element when the vehicular power source disposed at the vehicle and the household power source disposed at the house have been connected by the power source connecting element for the electric power supply in both directions, wherein
 the vehicle is a vehicle which drives a driving wheel at least by a motor,
 the vehicular power source is an electric accumulator, and
 the power supply controlling element performs to supply a discharged power from the electric accumulator to the house so as the discharged power from the electric accumulator is consumed on the house side, when a first warm-up operation which increases a temperature of the electric accumulator according to the power discharging of the electric accumulator is detected to be on operation by the vehicular power state detecting element.

2. The electric power supply system between a vehicle and a house according to claim 1, wherein
 the vehicle is a hybrid electric vehicle provided with a motor and an engine to drive a driving wheel; and
 the power supply controlling element performs to supply a discharged power from the electric accumulator or a generated power from the motor, which serves as the power generator by an actuation of the engine, to the house so as to consumed the discharged power or the generated power on house side, when it is detected by the vehicular power state detecting element that the electric accumulator operates the first warm-up operation or a second warm-up operation which increases the temperature of the electric accumulator according to the power charging by the generated power from the motor.

3. The electric power supply system between a vehicle and a house according to claim 1, wherein
 the power supply controlling element performs to supply the electric power from the vehicular power source to the house to compensate the shortage of output power from the household power source when the voltage of the output power from the household power source is detected to be equal to or lower than a predefined level by the household power state detecting element.

4. The electric power supply system between a vehicle and a house according to claim 1, wherein
 the vehicle is provided with a shift position detecting element configured to determine whether or not a shift lever is set at a position of parking, a motor configured to drive a driving wheel, and a switching element configured to switch on and off the electric power supply to the motor; and
 the electric power supply system further includes a power connection permitting element configured to permit the connection between the vehicular power source disposed in the vehicle and the household power source disposed in the house for the electric power supply in both directions by the power source connecting element, on condition that the shift lever is detected to be set at the position of parking by the shift position detecting element and the electric power supply to the motor is switched off by the switching element.

5. An electric power supply system between a vehicle and a house comprising:
 a power source connecting element configured to have a detachable connection between a vehicular power source disposed at the vehicle and a household power source disposed at the house for an electric power supply in both directions;
 a vehicular power state detecting element configured to detect a vehicular power state;
 a household power state detecting element configured to detect a household power state; and
 a power supply controlling element configured to switch a first state in which electric power is supplied from the vehicular power source to the house and a second state in which electric power is supplied from the household power source to the vehicle, on the basis of the vehicular power state detected by the vehicular power state detecting element and the household power state detected by the household power state detecting element, when the vehicular power source disposed at the vehicle and the household power source disposed at the house have been connected by the power source connecting element for the electric power supply in both directions, wherein
 the vehicular power source is a fuel cell, and
 the power supply controlling element performs to supply a generated power from the fuel cell to the house so as the generated power is consumed on the house side when a warm-up operation, which increases a temperature of the fuel cell according to the power generation of the fuel cell, is detected to be on operation by the vehicular power state detecting element.

6. The electric power supply system between a vehicle and a house according to claim 5, wherein
the power supply controlling element performs to supply the electric power from the vehicular power source to the house to compensate the shortage of output power from the household power source when the voltage of the output power from the household power source is detected to be equal to or lower than a predefined level by the household power state detecting element.

7. The electric power supply system between a vehicle and a house according to claim 5, wherein
the vehicle is provided with a shift position detecting element configured to determine whether or not a shift lever is set at a position of parking, a motor configured to drive a driving wheel, and a switching element configured to switch on and off the electric power supply to the motor; and
the electric power supply system further includes a power connection permitting element configured to permit the connection between the vehicular power source disposed at the vehicle and the household power source disposed at the house for the electric power supply in both directions by the power source connecting element, on condition that the shift lever is detected to be set at the position of parking by the shift position detecting element and the electric power supply to the motor is switched off by the switching element.

8. An electric power supply system between a vehicle and a house comprising:
a power source connecting element configured to have a detachable connection between a vehicular power source disposed at the vehicle and a household power source disposed at the house for an electric power supply in both directions;
a vehicular power state detecting element disposed at the vehicle and configured to detect a vehicular power state;
a household power state detecting element disposed at the house and configured to detect a household power state; and
a power supply controlling element disposed at the vehicle and configured to switch a first state in which electric power is supplied from the vehicular power source to the house and a second state in which electric power is supplied from the household power source to the vehicle, on the basis of the vehicular power state including at least a temperature of the vehicular power source detected by the vehicular power state detecting element and the household power state detected by the household power state detecting element when the vehicular power source disposed at the vehicle and the household power source disposed at the house have been connected by the power source connecting element for the electric power supply in both directions.

9. The electric power supply system between a vehicle and a house according to claim 8, wherein
the power source connecting element is configured to have a detachable connection between the vehicle and the house for the electric power supply in both directions via a power cable;
the electric power supply system further includes a power line communication transmitting element disposed at the vehicle and the house configured to communicate between the vehicle and the house by superimposing data in electric power lines of the power cable; and
the power supply controlling element performs to supply electric power from the vehicular power source to the house and performs to supply electric power from the household power source to the vehicle by determining that the vehicle and the house are in a connected state by the power source connecting element so as to enable the electric power supply in both directions when it is able to communicate between the vehicle and the house by the power line communication transmitting element.

10. The electric power supply system between a vehicle and a house according to claim 8, wherein
the vehicular power source is a fuel cell; and
the power supply controlling element performs a warm-up operation to increase a temperature of the fuel cell according to a power generation of the fuel cell when the temperature of the fuel cell detected by the vehicular power state detecting element is less than a predefined temperature of a lower limit, and performs to supply the generated power from the fuel cell to the house to consume the generated power on the house side.

11. The electric power supply system between a vehicle and a house according to claim 8, wherein
the vehicle is an electric vehicle provided with a motor to drive a driving wheel;
the vehicular power source is an electric accumulator; and
the power supply controlling element performs a warm-up operation which increases a temperature of the electric accumulator according to a power discharging of the electric accumulator, when a state of charge of the electric accumulator detected by the vehicular power state detecting element is equal to or more than a predefined level and the temperature of the electric accumulator detected by the vehicular power state detecting element is less than a predefined temperature of a lower limit, and performs to supply a discharged power from the electric accumulator to the house to consume the discharged power on the house side.

12. The electric power supply system between a vehicle and a house according to claim 8, wherein
the vehicle is a hybrid electric vehicle provided with a motor and an engine to drive a driving wheel;
the vehicular power source is an electric accumulator; and
the power supply controlling element performs a first warm-up operation which increases a temperature of the electric accumulator according to a power discharging of the electric accumulator when a state of charge of the electric accumulator detected by the vehicular power state detecting element is equal to or more than a predefined level and the temperature of the electric accumulator detected by the vehicular power state detecting element is less than a predefined temperature of a lower limit, or performs a second warm-up operation which increases the temperature of the electric accumulator according to a power charging of the electric accumulator by a generated power from the motor by operating the motor as a power generator by the actuation of the engine, when it is not able to increase the temperature of the electric accumulator according to a power discharging by the first warm-up operation due to the state of charge of the electric accumulator detected by the vehicular power state detecting element being lower than the predefined level, and when the first warm-up operation or the second warm-up operation is being performed, the power supply controlling element performs to supply the discharged power from the electric accumulator or the generated power from the motor to the house to consume the discharged power or the generated power at the house side.

13. The electric power supply system between a vehicle and a house according to claim 8, wherein
the power supply controlling element performs to supply the electric power from the vehicular power source to the house to compensate the shortage of output power from the household power source when the voltage of the output power from the household power source is detected to be equal to or lower than a predefined level by the household power state detecting element.

14. The electric power supply system between a vehicle and a house according to claim 8, wherein
the vehicle is provided with a shift position detecting element configured to determine whether or not a shift lever is set at a position of parking, a motor configured to drive a driving wheel, and a switching element configured to switch on and off the electric power supply to the motor; and
the electric power supply system further includes a power connection permitting element configured to permit the connection between the vehicle and the house for the electric power supply in both directions by the power source connecting element, on condition that the shift lever is detected to be set at the position of parking by the shift position detecting element and the electric power supply to the motor is switched off by the switching element.

\* \* \* \* \*